G. J. MARTEL.
TIRE PATCHING DEVICE.
APPLICATION FILED JAN. 3, 1911.

1,003,003.

Patented Sept. 12, 1911.

UNITED STATES PATENT OFFICE.

GUSTAVE J. MARTEL, OF CHICAGO, ILLINOIS.

TIRE-PATCHING DEVICE.

1,003,003. Specification of Letters Patent. Patented Sept. 12, 1911.

Application filed January 3, 1911. Serial No. 600,399.

*To all whom it may concern:*

Be it known that I, GUSTAVE J. MARTEL, a citizen of the United States, and a resident of the city of Chicago, county of Cook, and State of Illinois, have invented certain new and useful Improvements in Tire-Patching Devices, of which the following is a specification.

My invention relates to improvements in patching devices for pneumatic tires and has for its object the production of a device of this character which will be so designed as to be adapted to be readily and quickly applied or detached after application.

A further object is the production of a tire patching device which will be of durable and economical construction and of high efficiency in use.

Other objects will appear hereinafter.

With these objects in view my invention consists in a tire patching device hereinafter described and claimed.

My invention will be best understood by reference to the accompanying drawing forming a part of this specification and in which—

Figure 1:
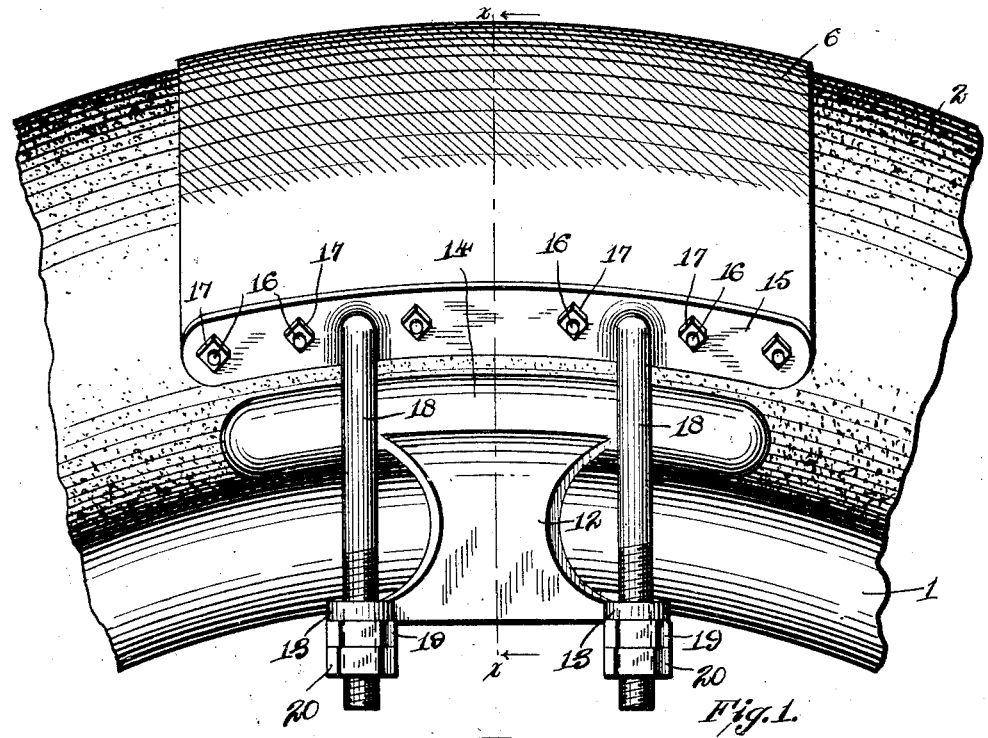
Figure 2:
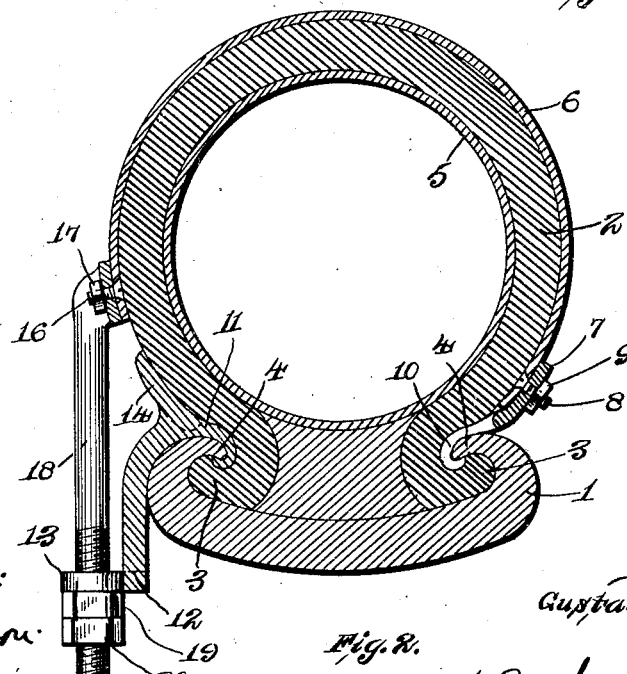

Figure 1 is a fragmentary side elevation of an ordinary pneumatic tire and a rim upon which the same is mounted, to which is applied a patching device embodying my invention, and Fig. 2 is a transverse section taken on substantially line *x—x* of Fig. 1.

Referring now to the drawing 1 indicates a conventional rim for a pneumatic tire, 2 indicating the tire casing the longitudinal edges 3 thereof being securely held in position by means of engaging flanges 4 formed at the edges of the rim 1 as is ordinary. 5 indicates the air tube which is mounted within the case 2.

Arranged about the tread portion of the tire is the patching strap 6 which is formed of any durable and flexible material, leather or rawhide preferably being used for this purpose. One of the extremities of the strap 6 is rigidly secured to a bar or yoke 7 by means of screws 8 and nuts 9, the latter being threaded upon said screws. The bar 7 is provided at its inner or lower edge with an engaging hook portion 10 which detachably engages the flange portion 4 of the rim 1 thereby adapting the bar 7 to rigidly hold one end of the strap 6 in the position indicated.

Detachably engaging the opposite flange 4 at a point directly opposite the hook portion 10 of the bar 7 is a hooked member 11. Formed integral with the member 11 is an outwardly and inwardly extending arm 12 at the inner end of which are formed two spaced outwardly projecting perforated lugs 13, the lugs 13 being preferably disposed at right angles to the arm 12, the latter being disposed preferably substantially parallel with the plane of rotation of the rim. Also formed integral with the member 11 at the outer edge thereof is an elongated flaring portion 14 which, when the member 11 is in operative position rests against the adjacent side of the tire, that is, the case 2 to counter-act any strain or force tending to tilt the lower end of the arm 12 outwardly.

Arranged at the opposite extremity of the strap 6 is a bar 15, the bars 15 and 7 being of similar construction, said bar 15 being rigidly secured to said strap by means of screws 16 and nuts 17, the latter being threaded upon inside screws. Formed integral with the bar 15 are two spaced parallelly disposed inwardly extending stems 18. The inner ends of the stems 18 project through the lugs 13, the same being screw threaded for the reception of nuts 19, the latter being adapted to rest against the inner or under sides of said lugs and thereby serve to maintain the strap 6 in embracing position about the tire. The arrangement is such, as will be observed, that by rotating said nuts 19 upon the stems 18 said strap may be tightened or loosened about the tire as desired. By means of lock nuts 20 threaded upon the stems 18 outward of the nuts 19, the latter may be held or locked in any position of adjustment.

With a construction as set forth it will be seen that when the hook portions 10 and 11 are in engagement with the flanges 4 of the rim, upon inflation of the tire, the latter will press tightly against the former serving to prevent disengagement thereof. The portion 14 resting against the outer side of the tire will counter-act the pull of the strap 6 upon the lower end of the arm 12 serving thereby to maintain the latter in the position indicated. With a device of the construction as set forth it may evidently be readily and quickly attached or detached, the same is so designed as to afford means of readily and easily adjusting the strap about the tire, and because of the simplicity of the construction the same is not susceptible to readily becoming inoperative.

While I have illustrated and described the preferred construction for carrying my invention into effect this may be varied somewhat without departing from the spirit of the invention. I, therefore, do not wish to be limited to the precise details of construction as set forth but desire to avail myself of such variations and modifications as come within the scope of the appended claims.

Having described my invention what I claim as new and desire to secure by Letters Patent is:

1. In a tire patching device, the combination with a rim and a tire mounted thereon, of a flexible patching strap extending over the tread portion of the tire; members detachably engaging the rim at opposite sides, one of said members being secured to one end of said strap and the other member being provided with an inwardly extending arm and an outwardly extending projection bearing against the side of the tire; and an adjustable connection between the other end of said strap and said rim, substantially as described.

2. In a tire patching device, the combination with a rim and a tire mounted thereon, of a flexible patching strap extending over the tread portion of the tire; hooked members at the extremities of said strap for securing the latter in operative position upon said tire, the hooked portion of said member detachably engaging the gripping flanges of said rim, one end of said strap being rigidly connected with one of said hooked members; an arm inwardly projecting from the other of said hooked members over the edge of said rim; and means engaging the other end of said strap and adjustably engaging the inner end of said arm whereby said strap may be tightened about said tire, substantially as described.

3. In a tire patching device, the combination with a rim and a tire mounted thereon, of a flexible patching strap extending over the tread portion of the tire; hooked members at the extremities of said strap for securing the latter in operative position upon said tire, the hooked portion of said members releasably engaging the gripping flanges of said rim, one end of said strap being rigidly connected with one of said hooked members; an arm inwardly projecting from the other of said hooked members over the edge of said rim; means engaging the other end of said strap and adjustably engaging the inner end of said rim whereby said strap may be tightened about said tire; and means on said last mentioned hook member adapted to rest against the adjacent side of said tire to counter-act any strain or force on the inner end of said arm tending tc hold the same outwardly, substantially as described.

In testimony whereof I have signed my name to this specification in the presence of two subscribing witnesses.

GUSTAVE J. MARTEL.

Witnesses:
HELEN F. LILLIS,
JOSHUA R. H. POTTS.

---

Copies of this patent may be obtained for five cents each, by addressing the "Commissioner of Patents, Washington, D. C."